United States Patent [19]

Bolding

[11] 4,296,739
[45] Oct. 27, 1981

[54] SOLAR COLLECTOR USING COTTON SEED OIL TO TRANSFER HEAT TO HEAVY OIL WELLS

[76] Inventor: Gaines H. Bolding, Box 389, Farmington, N. Mex. 87401

[21] Appl. No.: 162,367

[22] Filed: Jun. 23, 1980

[51] Int. Cl.³ .............................................. F24J 3/02
[52] U.S. Cl. ................................... 126/444; 126/435; 126/450; 126/900
[58] Field of Search ............... 126/449, 450, 444, 445, 126/900, 435; 165/168, 170, 169

[56] References Cited

U.S. PATENT DOCUMENTS

| 3,369,539 | 2/1968 | Thomason | 126/449 |
|---|---|---|---|
| 4,051,832 | 10/1977 | Stelzer | 126/450 |
| 4,132,221 | 1/1979 | Orillion | 126/450 |
| 4,149,525 | 4/1979 | Prado | 126/450 |
| 4,184,481 | 1/1980 | Tornquist | 126/450 |
| 4,184,543 | 1/1980 | Kleine et al. | 126/444 |
| 4,187,832 | 2/1980 | Tregoning | 126/450 |
| 4,203,421 | 5/1980 | Bencic | 126/444 |
| 4,205,662 | 6/1980 | Rhodes et al. | 126/444 |
| 4,211,213 | 7/1980 | Nissen | 126/449 |
| 4,249,520 | 2/1981 | Orillion | 126/450 |

Primary Examiner—Daniel J. O'Connor
Attorney, Agent, or Firm—Walter R. Keller

[57] ABSTRACT

A solar heating system for use in heating heavy parafin base and asphalt base oil wells to facilitate pumping, comprising a truncated pyramid shaped solar collector, using cotton seed oil as the heat transfer medium.

3 Claims, 3 Drawing Figures

SOLAR COLLECTOR USING COTTON SEED OIL TO TRANSFER HEAT TO HEAVY OIL WELLS

SUMMARY

At high temperatures, the oil in high parafin base oil high asphalt base oil wells becomes less viscous and thus pumping is facilitated. The concept of introducing heat to the oil wells using steam requires high temperatures and high pressures. It is therefore an objective of this invention to provide a means of using a novel solar collector, and an inexpensive abundant heat transfer medium which does not require high pressures.

BACKGROUND OF THE INVENTION

1. Field of the Invention

This invention relates generally to solar heating systems, and more particularly to a solar heating system for introducing heat into oil wells.

2. Description of Prior Art

There are many solar heating systems on the market today, and there have been a few systems devised for introducing heat into an oil well. One of the major problems with heating an oil well is the requirement for large amounts of heat. Prior systems concentrated on introducing steam at high temperatures and the correspondingly high pressures. The economics of such systems have rendered then virtually impractical. The inventor knows of no design of a solar collector similar to this invention, and the use of cotton-seed oil as a heat transfer medium is believed to be totally new.

DESCRIPTION OF THE PREFERRED EMBODIMENT

Figure 1:
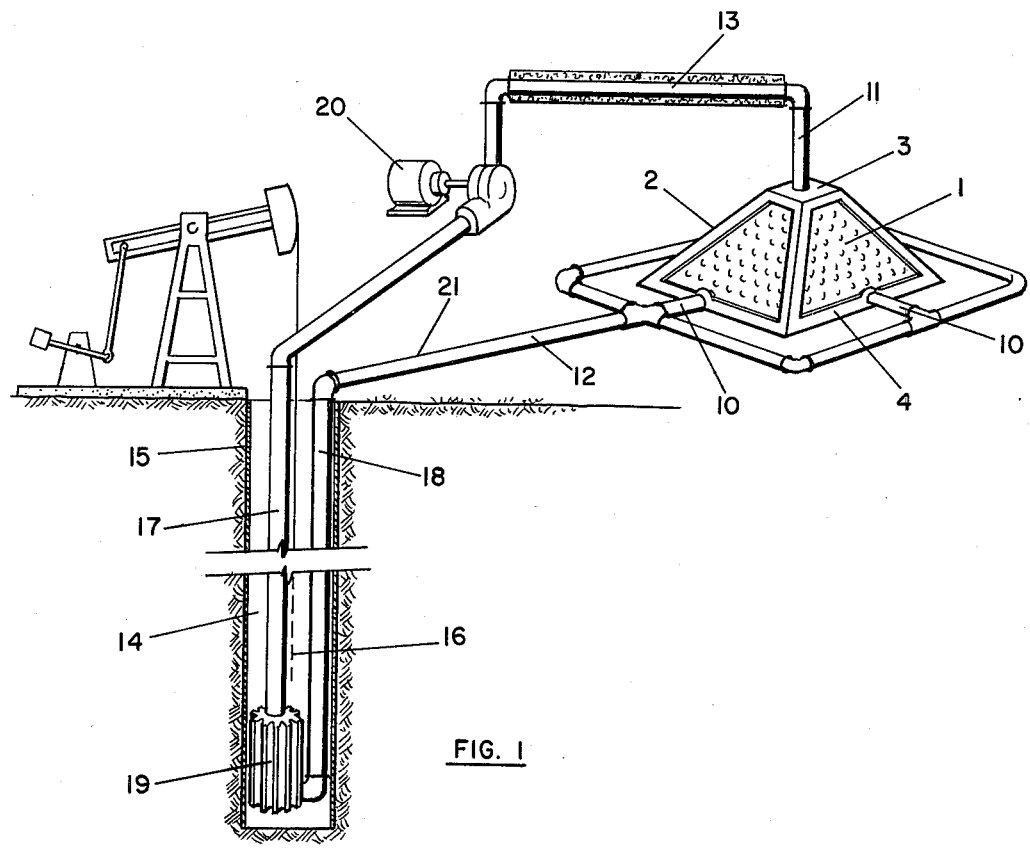
FIG. 1 is a schematic of the invention
Figure 2:
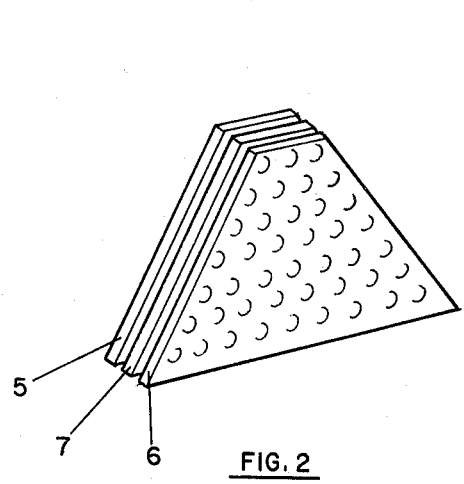
FIG. 2 is an isometric view of a panel
Figure 3:
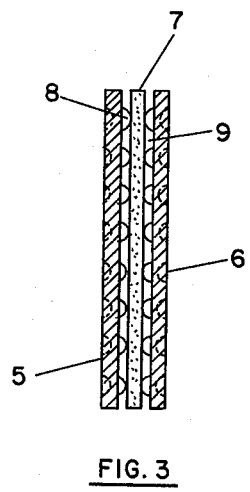
FIG. 3 is a cross section cut on A—A of FIG. 2.

As shown in FIG. 1, the solar collector 1 is shaped generally as a truncated pyramid. The solar collector 1 has four side panels 2, each identical, and a top 3 and a bottom 4. Each side panel 2 is constructed of a metal having high heat conductivity such as copper or aluminum. FIG. 3 shows each side panel 2 to be constructed of three plates, an interior plate 5, an exterior plate 6, and a center plate 7. FIG. 3 shows that the center plate 7 is a smooth sheet, while the exterior plate 6 and the interior plate 5 are dimpled, so that the dimples 8 are toward the center plate 7. The dimples 8 provide spacing 9 between the exterior plate 6 and the center plate 7, and likewise between the center plate 7 and the interior plate 5. Each panel 2 is then sealed as by silver soldering on its sides and a plurality of input ports 10 are sealed into the bottom of each panel 2. A plurality of outlet ports 11 are sealed into the top of each panel 2. Thus a heat transfer fluid 12 can pass between the exterior plate 6 and the center plate 7, and between the center plate 7 and the interior plate 5. The four panels 2 are then rigidly joined at their sides by a strip angle iron 3 to form the pyramid. The bottom 4 and the top 3 of the pyramid are then closed by sealing with relatively non-heat-conducting material such as glass. The invention uses cottonseed oil as the heat transfer fluid 12. Cottonseed oil has a boiling point of approximately 1018° C. at standard pressure, and its melting point is approximately minus 1° C. Thus, the high temperature and heat capacity of the heat transfer fluid 12 enhances the conductivity and radiation of heat from the transfer fluid 12. The output ports 11 are connected to insulated pipes 13 which direct the transfer fluid 12 to an oil well 14. The oil well 14 has within it the usual casing 15 and well string 16. The well string 16 extends from the surface of the earth to the bottom of the oil well 14 and is made of segments of pipe. A hot pipe 17 and a cold pipe 18 is run down the oil well 14 by being banded to each segment of the well string 16. In the vicinity of the oil bearing layer of earth, a heat exchanger 19 of known design and construction connects between the hot pipe 17 and the cold pipe 18. The exchanger 19 is shown as a finned segment of pipe. The heat exchanger 19 could also be a series of coils. The hot pipe 17 at the surface is connected to a pump 20, said pump 20 also being connected to the insulated pipe 13. The cold pipe 18 is connected to a return input pipe 21, said return input pipe being connected to the plurality of input ports 10. Thus, the cycle is closed. The need for additional booster pumps in the system as required by individual site characteristics in recognized. In addition, in order to adequately supply heat to the oil bearing layer of earth, it is recognized that additional pilot wells surrounding the producing well may be needed, and that multiple collector and piping systems may be needed for each producing well. In addition it is obvious that an auxiliary or alternate heat source, such as a natural gas heater may be placed in the cycle for use when the solar energy incident on the collector is insufficient. The shape of the collector 1 is such that very high temperatures can be achieved due to an "oven" effect, and this enhances the efficiency of the system, especially when combined with the use of cottonseed oil as the heat transfer fluid 12. Cottonseed oil is very plentiful, and inexpensive, especially when acquired in quantity. The use of standard thermostats and other automatic controls in the system to provide automatic functioning is contemplated as within this invention.

I claim:

1. A solar collector having a generally truncated pyramid shape comprising a top, a bottom and four side panels wherein;

each side panel is constructed of a heat conductive metal, and has a center plate, an interior plate and an exterior plate, and;

the interior plate is dimpled and the exterior plate is dimpled and the center plate is flat, and the sides of each panel are sealed and a plurality of outlet ports are sealed into the top of each panel, and a plurality of inlet ports are sealed into the bottom of each panel, and the panels are mounted in a pyramid frame, and the top and the bottom of the collector are sealed with non conductive material, and a suitable heat transfer fluid is forced to pass between the exterior plate and center plate, and between the interior plate and center plate, and wherein the collector is connected to circulating pipes of the system using heat.

2. The invention of claim 1 wherein the heat transfer fluid is cottonseed oil.

3. The invention of claim 1 wherein the circulating pipes of the system using heat comprise hot pipes, cold pipes and a heat exchanger connected together and banded to the well string of an oil well in a manner such that the hot pipes direct the heated transfer fluid down into the well, to and through the heat exchanger positioned near the bottom of the well and thence up the cold pipes to the collector.